United States Patent [19]

Goudy, Jr.

[11] Patent Number: 4,879,489
[45] Date of Patent: Nov. 7, 1989

[54] RADIATION-EMITTING DEVICES

[75] Inventor: Paul R. Goudy, Jr., Bayside, Wis.

[73] Assignee: Photo Redux Corp., Milwaukee, Wis.

[21] Appl. No.: 147,499

[22] Filed: Jan. 25, 1988

Related U.S. Application Data

[62] Division of Ser. No. 827,549, Feb. 10, 1986, Pat. No. 4,721,875.

[51] Int. Cl.[4] .................. H01J 61/30; H01J 61/52
[52] U.S. Cl. ..................................... 313/15; 313/634
[58] Field of Search ................. 313/634, 35, 36, 15, 313/24; 250/436(U.S. only), 438 (U.S. only), 455.1 (U.S. only); 372/72 (U.S. only); 422/22 (U.S. only), 24 (U.S. only)

[56] References Cited

U.S. PATENT DOCUMENTS

| | | |
|---|---|---|
| 1,794,343 | 2/1931 | Smalley . |
| 2,095,291 | 10/1937 | Schneider . |
| 2,102,049 | 12/1937 | Warren . |
| 2,154,109 | 4/1939 | Parks . |
| 2,205,000 | 6/1940 | Spanner . |
| 2,213,245 | 9/1940 | Germer . |
| 2,255,431 | 9/1941 | Marden et al. . |
| 2,364,889 | 12/1944 | Blair . |
| 2,445,012 | 7/1948 | Van Orden . |
| 2,482,421 | 9/1949 | Lemmers . |
| 2,596,697 | 5/1952 | Krefft . |
| 2,674,697 | 4/1954 | Nicholson . |
| 2,862,337 | 12/1958 | Shaw et al. . |
| 2,916,645 | 12/1959 | Lemmers et al. . |
| 2,935,611 | 5/1960 | Myers . |
| 2,962,932 | 12/1960 | Kaprelian ................. 313/634 X |
| 3,121,183 | 2/1964 | Swanson . |
| 3,226,590 | 12/1965 | Christy . |
| 3,253,176 | 5/1966 | Pate et al. . |
| 3,295,003 | 12/1966 | Chernin . |
| 3,303,042 | 2/1967 | Reed et al. . |
| 3,471,630 | 10/1969 | Gibbons et al. . |
| 3,527,940 | 9/1970 | Balanca et al. . |
| 3,560,787 | 2/1971 | Clay et al. .................. 313/36 X |
| 3,566,105 | 2/1971 | Wiltrout et al. . |
| 3,624,444 | 11/1971 | Berthold et al. ............. 313/635 X |
| 3,717,781 | 2/1973 | Sadoski et al. ............. 313/635 X |
| 3,988,633 | 10/1976 | Shurgan et al. . |
| 4,008,045 | 2/1977 | Free . |
| 4,017,734 | 4/1977 | Ross . |
| 4,140,385 | 2/1979 | Shaw et al. ............... 313/15 X |
| 4,196,374 | 4/1980 | Witting . |
| 4,234,817 | 11/1980 | Teshima et al. . |
| 4,260,931 | 4/1981 | Wesselink et al. . |
| 4,272,702 | 6/1981 | Teshima et al. . |
| 4,281,271 | 7/1981 | Young et al. . |
| 4,320,324 | 3/1982 | Ariga et al. . |
| 4,323,810 | 4/1982 | Horstmann ............... 313/634 X |
| 4,336,223 | 6/1982 | Hillman . |
| 4,445,069 | 4/1984 | Van Amstel . |
| 4,454,448 | 6/1984 | Roberts . |
| 4,468,590 | 8/1984 | Akutsu et al. . |
| 4,482,809 | 11/1984 | Maarschalkerweerd . |
| 4,514,662 | 4/1985 | Skeist et al. . |
| 4,520,290 | 5/1985 | Cokefair . |
| 4,535,247 | 8/1985 | Kurtz . |
| 4,663,564 | 5/1987 | Kobale et al. . |

FOREIGN PATENT DOCUMENTS

| | | | |
|---|---|---|---|
| 0061756 | 5/1981 | Japan ..................... | 313/493 |
| 0189154 | 9/1985 | Japan ..................... | 313/634 |

Primary Examiner—Palmer C. DeMeo
Attorney, Agent, or Firm—Peter N. Jansson

[57] ABSTRACT

An improved radiation-emitting device of the type for containing gas and an electron flow therein between electrodes. First and second separate elongated principal members form an elongated envelope volume having constant cross-sections along its length. The first principal member is outwardly convex and radiation-transmissive and the second is inwardly concave and radiation-reflective, preferably having a metallic inner coating. The members are arranged and configured so that the envelope volume is less than that of a cylinder of similar cross-dimension. Pural electrodes are preferably used.

20 Claims, 5 Drawing Sheets

RADIATION-EMITTING DEVICES

RELATED APPLICATIONS

This is a division of U.S. patent application Ser. No. 827,549, filed Feb. 10, 1986, entitled "Improved Radiation-Emitting Devices," which issued as U.S. Pat. No. 4,721,875 on Jan. 26, 1988. Filed concurrently herewith are two other divisions, Ser. Nos. 147,882 and 147,498, each having the same title Improved Radiation-Emitting Devices.

FIELD OF THE INVENTION

This invention is related generally to devices having gas-containing envelopes for emitting radiation in response to an electron flow and, more particularly, to the configuration of the envelopes used for such devices.

BACKGROUND OF THE INVENTION

In recent years, radiation-emitting devices have been widely used for an increasing number of purposes. All of such radiation-emitting devices include an envelope, an enclosed gas, and a pair of electrodes between which an electron flow is established.

Those skilled in the art are familiar with the operation of such devices, and it is not necessary to recite here operational details which have little bearing on this invention. It suffices to note that when an electron flow is established between electrodes, electrons strike certain atoms, such as mercury, and raise the energy level of another electron in the atom. When this electron (e.g., in the mercury atom) returns to its normal state, a ray of ultraviolet energy is released.

Such emissions are used for various purposes, including: lighting, by exciting phosphors as in fluorescent lamps; treating flowing liquids, such as water; and initiating laser discharges. One application to which this invention is particularly relevant is the treatment of flowing liquids.

This invention deals primarily with structural aspects of such radiation-emitting devices.

Many variations have been made in radiation-emitting apparatus, including variations in the gases, in gas pressures, in various devices for creating conditions necessary for radiation discharge, and in mounting structures for such devices, to name just a few. Some variations have been made in the size and shape of gas-containing envelopes.

The dominant shape of radiation-emitting envelopes has been cylindrical. Variations have dealt primarily with such things as doubling back the envelope to increase the length of the electron path for a single electron discharge and deforming portions of the envelope to create a more tortuous electron path for various purposes. In most cases, however, the common cylindrical envelope shape has been used in one way or another.

There are a number of problems and disadvantages with radiation-emitting devices of the prior art. Some of these will be briefly mentioned.

In many devices of the prior art, portions of the envelope volume have a sparsity of active fluorescing sites. And there is too great a degree of radiation reabsorption by the gas within envelopes of the prior art.

Prior art devices have some disadvantages relating to a failure to efficiently apply emitted radiation on a material to be irradiated, particularly flowable materials. Regions of flowing material are often too remote from the radiation source to be effectively treated. The law of inverse squares, in many structures for fluid treatment by radiation emitted outwardly through a cylindrical wall, creates areas of unacceptable exposure. And, passage of a fluid to be treated through an array of cylindrical radiation-emitting tubes often creates turbulence which is a negative factor on irradiation effectiveness.

The envelope structures of the prior art have other problems which are related to envelope materials. The standard cylindrical envelope, in order to use high-pressure gases as is often desirable t increase radiation output, require quartz envelope cylinders which are extremely thick, in order to provide sufficient strength. That is because quartz and similar radiation-transmissive materials, while they function well under compression (that is, pressure applied to a convex surface) do not withstand tension (that is, pressure applied to a concave surface) very well.

Finally, envelopes of prior art radiation-emitting devices are not easily adaptable to meet the varying requirements of important radiation-emitting applications. There is a need for envelopes and envelope concepts which can be adapted and engineered to better serve important practical needs.

There is a need for improved envelope devices which can increase efficiency of radiation emission, and for improved devices maximizing the number of active fluorescing sites within the envelope. More specifically, a need exists for an improved radiation-emitting envelope which reduces the reabsorption of radiation occurring within the envelope volume. There is a need for an envelope which decreases the path length that radiation must travel before leaving the envelope, while at the same time directing the radiation more specifically toward an exterior target than is the case with the standard cylindrical envelope.

Another significant need is to provide envelope structures which are more suitable for certain specific purposes than the current cylindrical envelopes. There is a need for radiation-emitting envelopes which apply radiation more effectively to materials to be irradiated, particularly fluid streams, as in water purification. There is a need for envelopes which can minimize the turbulence in a stream of fluid passing them for irradiation.

There is a need for envelope structures which can contain high-pressure gas and yet not require thick and expensive radiation-transmissive members. Also there is a need for envelopes structures which can be made using materials which may be formed as required to achieve various purposes. There is a need for a radiation-emitting envelope which can eliminate the need for a separate holder.

There is a need for improved radiation-emitting envelopes which lend themselves to easy fabrication and maintenance, are simple to install and efficient in operation.

BRIEF SUMMARY OF THE INVENTION

The improved radiation-emitting devices of this invention overcome certain problems and deficiencies of the prior art. An important characteristic of the invention is its non-cylindrical structural concept, which may be embodied in various envelope configurations. The structural concepts of this invention provide a number of advantages, including overcoming the problems and addressing the needs recited above.

The radiation-emitting envelopes of this invention include first and second separate elongated principal members which are in fixed positions relative to one another and define an elongated envelope volume having a substantially constant cross-section along its length.

The first principal member of the device of this invention is an arcuate member which is outwardly convex (inwardly concave), while the second principal member is inwardly concave. The two principal members are configured and located such that the envelope volume between them is less than the volume of a cylinder having a diameter equal to the largest cross-dimension of the envelope volume. "Cross-dimension" means a straight line extending across the cross-section of the envelope volume even though, by virtue of the shape of such cross-section, a portion of such straight line passes outside the envelope volume.

The first principal member is radiation-transmissive to form a radiation-transmitting portion which is substantially free of discontinuities which could weaken it and which in use is under compression, such that it can be thin to reduce absorption of radiation. The first principal member is preferably quartz or other similar transparent glass-like material. The first principal member is preferably the only member through which radiation is intended to be emitted from the envelope.

The second principal member is radiation-reflective, and preferably made radiation-reflective by means of a metallic coating on its inner surface. A number of materials can be used for this inner coating. Aluminum is a particularly preferred coating material. The metallic coating, which may be applied by a sputtering method in a very thin, even monomolecular, film serves the additional valuable purpose of isolating the remainder of the second principal member from the gas within the envelope. This prevents absorption of such gas into the polymeric or other material which forms the second principal member.

The metallic coating may itself be covered by a very thin protective covering layer to reduce or eliminate any corrosion which might be caused by the gas within the envelope. Such coating may be of any material which is essentially impervious to the gas being used in the envelope.

First and second mounting means are secured with respect to the principal members and have inward portions facing each other across the envelope volume. Mounted along the inward portions of the first and second mounting means, respectively, are first and second electrode means which create the electron flow which triggers radiation emissions.

The mounting means may be cap-like end members for the elongated envelope, such that the electrodes thereon create an electron flow along the length of the elongated envelope volume. Or the mounting means, and thus the electrode means, may extend along the length of the envelope between corresponding pairs of opposed edges of the first and second principal members, such that the electron flow is across the width of the elongated envelope volume.

In highly preferred embodiments, the second principal member is made of formed polymeric material, such as certain thermoplastic or thermosetting materials formed by well-known molding methods or the like. The use of plastics and various well-known plastic-forming methods provides a great deal of design freedom to allow the formations of designs accommodating particular needs.

This invention serves several purposes which will become apparent.

In the devices of this invention, the use of the radiation-emitting gas within the envelope is improved in several ways. Envelope volume is reduced in order to increase the radiation-emitting surface per unit envelope volume and to reduce the absorption of radiation which occurs as radiation travels in the gas environment within the envelope volume. The number of active fluorescing sites within the envelope volume is maximized by various means, including increasing the number of collisions of electrons with radiation-emitting atoms. One way this is accomplished is by using a wide electron flow.

The number of radiation discharges failing to exit the envelope is reduced by virtue of the reduced envelope volume, which decreases the path length that radiation travels before exiting the envelope and spreads the radiation-emitting sites to place them closer to a radiation-emitting surface. And, at the same time, the devices of this invention can direct radiation more specifically toward a target.

Another purpose of the envelope configuration of this invention is to provide structures which are more suitable for certain practical applications, such as the irradiation of flowing fluids. The configurations of this invention are intended to achieve these purposes while also lending themselves to easy fabrication and maintenance.

The envelopes of this invention are more readily placed with their radiation-emitting surfaces or "windows" in proximity to a flowing liquid than envelopes of the prior art. All parts of the path of fluid flow may be situated closer to the point of radiation emission, reducing areas of ineffective irradiation.

In addition, the nature of the radiation-emitting surfaces of the envelopes of this invention allows passage of fluids with less turbulence than often occurred in the flow of fluids around the outsides of a plurality of cylindrical tubes. The radiation-emitting surfaces of the envelopes of this invention can be such that flow is more easily made obstruction-free.

Some additional purposes of this envelope configuration relate to obtaining cost reductions and operational efficiencies in various ways. For example, when used in applications such as water treatment for which maintenance and replacement costs are high, this invention makes maintenance and element replacement less difficult and less expensive.

This invention allows the joining of parallel envelopes to form radiation "walls" which have a number of envelope volumes arranged in closely parallel fashion. Such walls, described later in more detail, offer efficiencies in water-treatment and other similar applications.

As mentioned above, the envelopes of this invention, including those having the radiation walls referred to above, can have a second principal member formed to provide an integral holder for the envelope, eliminating or substantially modifying the need for a separate envelope holder. Thus, the device of this invention can function as both the envelope and the holder.

And, the second principal members, preferably those which are of formed polymeric material, can also have integrally-formed support means of various kinds, to suit various needs relating to a particular use.

The inner surface of the second principal member may have other characteristics intended for various purposes. The inner surface need not be smooth. For example, it may be formed with Fresnel segments each being shaped to provide reflection in a specific direction. Such Fresnel segments would preferably be parallel to the elongated envelope.

In preferred embodiments of this invention, the first and second electrode means each comprise a plurality of electrodes which are mounted in spaced fashion along the inward portions of the first and second mounting means, respectively. This provides for a wide area of effective electron flow within the envelope. Such flow, as previously noted, may be along or across the volume of the elongated envelope, depending on the location of the electrode means.

The envelope configuration concept of this invention may be embodied in a number of varying forms. Some of the most preferred forms will now be described in greater detail.

The first and second principal members of the envelope of this invention have two pairs of corresponding opposed edges along their lengths. In certain embodiments, the first and second mounting means are elongated mounting members each of which is between one of the pairs of corresponding opposed edges. A plurality of electrodes are mounted along such elongated mounting members, and the electron flow is across the width of the volume of this envelope.

In certain other embodiments, the first and second mounting means are end members secured at opposite ends of the first and second principal members. Such end members have inward portions along which electrodes are spaced at each end of the envelope. In this embodiment, the electron flow will be along the length of the envelope volume.

In this invention, the use of a low-pressure gas in the envelope volume is preferred, although higher pressure could be used depending on the thickness of the principal members and other structural considerations.

Reinforcement means may be included along the lengths of the envelopes. The first and second principal members, as previously noted, have two pairs of corresponding opposed edges along their lengths, and reinforcement means may be situated between each of these pairs of corresponding opposed edges. In a preferred embodiment, the mounting members to which the electrodes are secured serve as the reinforcement means. Such mounting and reinforcing members are preferably made of a material, such as the material identified by the trademark TEFLON, which is impermeable to the gas within the volume.

The envelopes of this invention may be readily formed into radiation-emitting "walls," as briefly described above. Such devices have a number of similar envelopes aligned in closely-adjacent parallel fashion. The first principal members are substantially parallel and form the radiation-emitting wall, and the second principal members, of course, are also parallel.

It is highly preferred that the first principal members forming such radiation-emitting wall be integrally formed. In such embodiments a piece of quartz glass formed with similar arcuate portions and intervening sealing and support areas may be used. The arcuate portions each form the first principal member of one envelope of the grouping. It is also preferred in such embodiments that the second principal members be integrally formed. The integrally-formed second principal members are preferably made of formed polymeric material, which is shaped to accommodate the integrally formed first member piece. This multiple-envelope structure may easily be fabricated and has a great deal of structural integrity making it useful in water-purification applications and the like.

The various envelope configurations utilizing the concept of this invention, in which there is often a greater radiation-emitting surface area per envelope volume, will often tend to emit heat faster than the standard single cylindrical tube envelope of the prior art. In a preferred form of this invention, heating means are secured to the second principal member outside the envelope volume in order to heat the gas within the envelope, as is desirable for radiation emission.

As previously described, the second principal members may be formed to accommodate heating means. The heating means may be fixed heating elements located in or affixed to the second principal members or may involve channels in the second principal member or elsewhere through which a heated fluid passes. The heating means are preferably separate from the electrode means, and with such separate heating means the need for starter apparatus may be eliminated.

When a metallic coating is on the inside of the second principal member, it not only serves to make the second principal member radiation-reflective, but also serves as a good conductor of heat from the heating means affixed to the such member.

OBJECTS OF THE INVENTION

It is an object of this invention to provide improved gas-containing radiation-emitting devices.

Another object of this invention is to provide radiation-emitting devices having improved operating efficiency.

Another object of this invention is to provide improved envelopes for emission of radiation maximizing the number of active fluorescing sites.

Another object of this invention is to provide radiation-emitting devices from which an increased proportion of the radiation which is created within the envelope volume exits the envelope as usable radiation.

Another object of this invention is to provide an improved radiation-emitting envelope for which the radiation average path within the envelope is shortened.

Another object of this invention is to provide an improved type of radiation-emitting envelope which may be readily engineered to accommodate specific purposes and specific tasks.

Another object of this invention is to provide radiation-emitting envelopes which are particularly advantageous for the treatment of flowing liquids.

Another object of this invention is to provide an improved radiation-emitting envelope having increased effectiveness of radiation application to fluid flowing outside the envelope volume.

Another object of this invention is to provide improved radiation-emitting envelopes which may apply radiation to a flowing fluid with reduced turbulence in the flowing fluid.

Another object of this invention is to provide radiation-emitting structures for use in water purification which are easy to fabricate and easy to maintain.

Another object of this invention is to provide envelopes for radiation emission which can be deployed to form a radiation-emitting wall.

Yet another object of this invention is to provide a radiation-emitting envelope structure which can use inexpensive materials.

Another object of this invention is to provide a radiation-emitting envelope structure which allows the use of high-pressure gas with a thin envelope wall.

These and other objects will be apparent from the following additional descriptions and from the drawings, wherein:

DETAILED DESCRIPTIONS OF PREFERRED EMBODIMENTS

The figures illustrate several different preferred embodiments of the invention broadly described herein. In describing these embodiments, corresponding parts will be identified by numbers having the same last two digits. The invention of particular attention here is illustrated most specifically in FIGS. 6, 7 and 7A; certain principals applicable to such invention, however, are illustrated in other figures.

Figures 1, 2, 3:
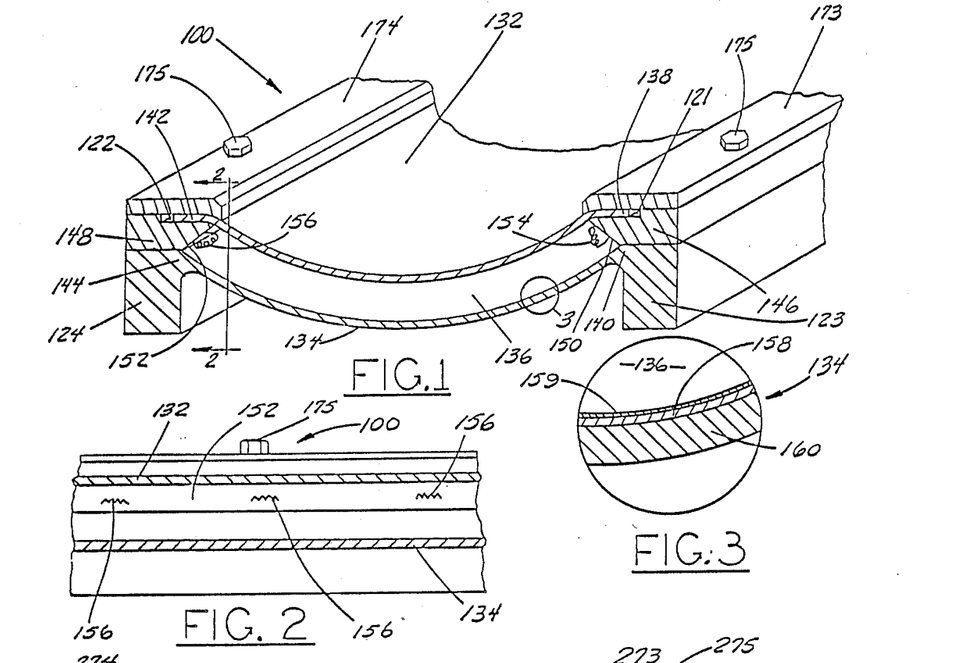
FIG. 1 is a fragmentary sectional perspective of a radiation-emitting device.
FIG. 2 is an auxiliary sectional view taken along section 2—2 as indicated in FIG. 1.
FIG. 3 is a magnified view of the portion identified by numeral 3 in FIG. 1.
Figure 4:
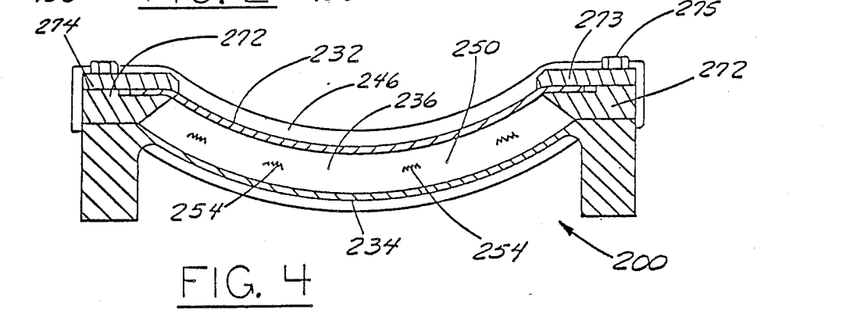
FIG. 4 is a sectional view of a variant of the device of FIG. 1, using a gas-containing envelope of substantially identical shape.
Figure 5:
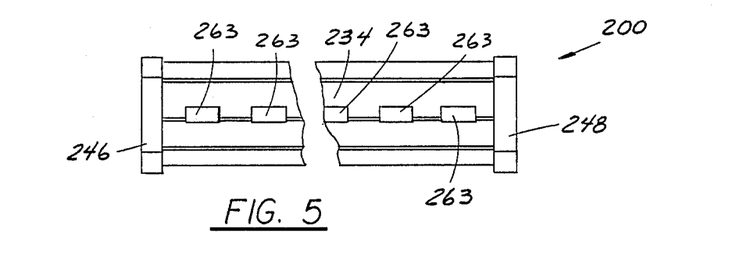
FIG. 5 is a reduced bottom view of FIG. 4.
Figure 6:
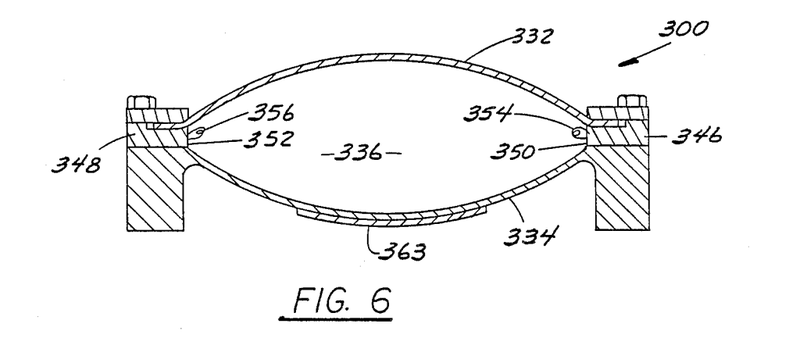
FIG. 6 is a sectional view (without background of a radiation-emitting device in accordance with this invention, looking along a straight elongated gas-containing envelope.
Figure 7:
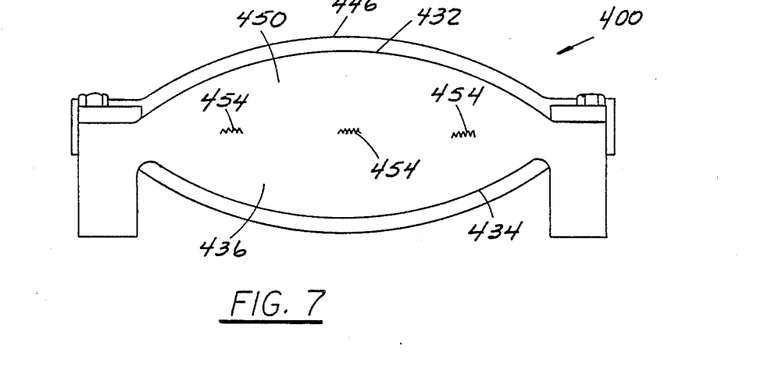
FIG. 7 is a view as in FIG. 6, but without details of a variant of the embodiment of FIG. 6 using a gas-containing envelope of substantially identical shape.
Figure 7A:
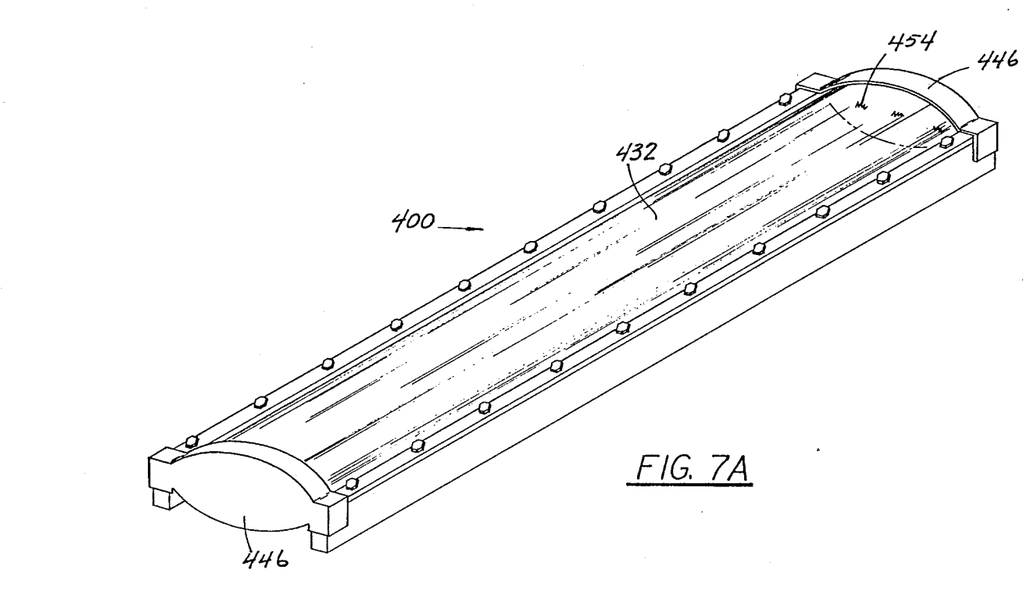
FIG. 7A is a reduced perspective view of the device of FIG. 7.
Figure 12:
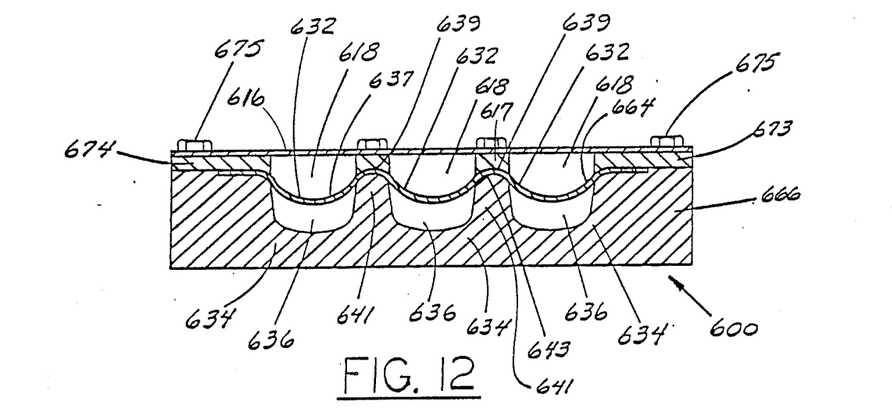
FIG. 12 is a sectional view (without background) of still another radiation-emitting device.
Figure 13:
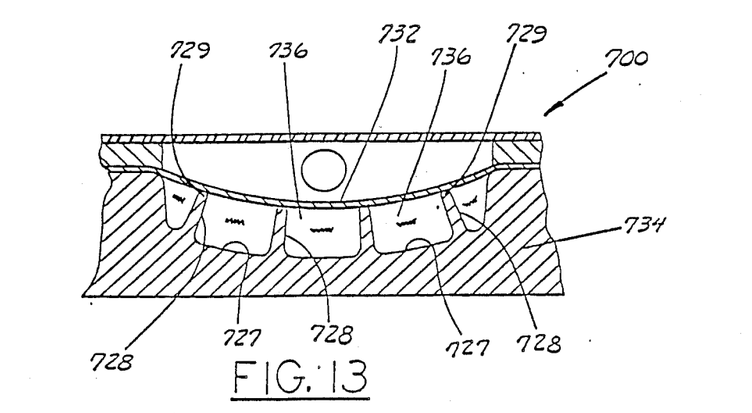
FIG. 13 is an enlarged fragmentary sectional view, taken across the length of an elongated envelope, illustrating a variation.

FIGS. 1-3 show a radiation-emitting device 100. FIGS. 4 and 5 show a radiation-emitting device 200 which is a variant of device 100. FIGS. 6 and 7 show devices 300 and 400, respectively, which are claimed herein. Device 400 is a variant of device 300. FIGS. 8-11 illustrate still another radiation-emitting device 500; FIG. 12 shows a multi-envelope radiation-emitting device 600; and FIG. 13 shows yet another radiation-emitting device 700.

Referring first to FIGS. 1-3, radiation-emitting device 100 has first and second separate elongated principal members 132 and 134, respectively. First and second elongated principal members 132 and 134 ar in fixed relative positions and define an envelope volume 136 which has a substantially constant cross-section along its length. In cross-section, first principal member 132 of device 100 is outwardly concave and second principal member 134 is inwardly concave, making envelope volume 136 arcuate in cross-sectional shape.

First principal member 132 preferably is made of quartz or other radiation-transmissive glass. It becomes the sole surface through which radiation is emitted from device 100. Second principal member 134 is preferably of a substantially rigid formed polymeric material, as will hereafter be described, and has support members 123 and 124 formed with it. Its inner surface is radiation-reflective as will hereafter be described.

Principal members 132 and 134 have two pairs of corresponding opposed edges 138-140 and 142-144 extending along their common lengths. A first elongated mounting member 146 is between opposed edges 138 and 140 and a second elongated mounting member 148 is between opposed edges 142 and 144. Mounting members 146 and 148 are preferably made of, or well coated with, materials which are substantially non-absorbent with respect to the gas within volume 136, such as the material known by the trademark TEFLON. TEFLON is preferred because it is not only non-absorbent but has other properties which allow it to function well as a seal for the envelope volume.

Mounting members 146 and 148 have ledge portions 121 and 122, respectively, which receive opposite edges 138 and 142 of first principal member 132. The width of second principal 134 is such that when mounting members are place squarely thereon, the ledge portions are wide enough to accommodate opposited edges 138 and 142 of first principal member 132 with room to spare. This serves to accommodate relative dimensional changes in first and second principal members 132 and 134 which may occur when the temperature of the device rises during use. Clamping members 73 and 174 sandwich edges 138 and 142 of first principal member 132 against mounting members 146 and 148, respectively, by means of fasteners 175, which extend through mounting members 146 and 148 for engagement with second principal member 134.

First and second elongated mounting members 146 and 148 have inward portions 150 and 152, respectively, which are flat surfaces exposed to envelope volume 136 and extending along the length of device 100. The largest inner cross-dimension of envelope volume 136 is a line extending from inward portion 150 to inward portion 152. It is apparent that envelope volume 136 is less than the volume of a cylinder having a diameter equal to the largest inner cross-dimension of envelope volume 136.

A plurality of electrodes 154, forming a first electrode means, are mounted along inward portion 150, and another plurality of electrodes 156, forming a second electrode means, are mounted along inward portion 152, along the length of device 100. The pluralities of electrodes 154 and 156 are within envelope volume 136 and are in pairs facing each other, with an equal number of electrodes being on each of the inward portions 150 and 152. FIG. 1 illustrates one each of the electrodes 154 and 156, the others not being shown, and FIGS. 1 and 2 illustrate several of the electrodes 156.

First and second elongated mounting members 146 and 148 serve not only as mounting means for electrodes 154 and 156, but serve to reinforce the envelope structure along its length.

As previously noted, the inner surface of second principal member 134 is radiation-reflective. FIG. 3 is a closeup cross-sectional view of second principal member 134, illustrating a metallic coating 158 (most preferably aluminum) on the inner surface of second principal member 134. The major portion 160 of the thickness of second principal member 134, illustrated in FIG. 3, is a substantially rigid formed polymeric material, and the metallic coating 158 may be applied by a sputter-coating process or other known coating methods. The metallic layer 158 may then be coated by a thin layer 159 of material, such as the materials hereafter mentioned, to protect it from the corrosion effects or other deleterious effects of the gases within envelope volume 136. Layer 159 is preferably applied by spraying.

The second principal members of each of the devices illustrated in the drawings ma have a coated inner surface similar to that described above and shown in FIG. 3. Other types of reflective coatings may be used and the second principal member may be made reflective in other ways. However, metallic coatings, preferably of aluminum, are most preferred.

Radiation-emitting device 100 is closed at either end by end members (not shown) which are sealed in fluid-tight fashion against principal members 132 and 134 and elongated mounting members 146 and 148. The end members preferably have inner surfaces which are non-absorbent to the gas within volume 136.

In certain applications, device 100 can utilize a high-pressure gas in envelope volume 136. This can increase the level of radiation emissions, because of the increased incidence of electron collisions with the radiation-emitting atoms in envelope volume 136. Examples of gases include mercury vapor and sodium vapor, and high pressures are within the range of high-pressure envelopes of the prior art.

In envelopes like device 100, the outward concavity of first principal member 132 is advantageous in various ways—particularly when device 100 is being used for the treatment of flowing liquids. One important advantage of envelopes of such shape is seen when used with a high-pressure gas. In such cases, the high gas pressure within volume 136 is offset by the force of the weight of the liquid being treated, which is applied to the weaker outwardly-concave first principal member 132. The outward concavity of first principal member 132 and such offsetting forces make possible the fabrication of first principal member 132 of device 100 with material thinner than is possible for any high-pressure radiation emitter of the prior art.

Another important advantage of the outwardly-concave configuration of first principal member 132 in fluid-treatment applications is that it, along with the inwardly-concave configuration of reflective second principal member 134, serves to direct a great deal of radiation on liquid flowing over device 100. Such directionality eliminates radiation losses which are common in many devices of the prior art.

Such directionality also allows a number of similar radiation-emitting devices to be placed side by side to form a radiation-emitting wall. FIG. 12, described later herein, illustrates such a preferred radiation-emitting device 600.

Radiation-emitting device 200, shown in FIGS. 4 and 5, has first and second principal members 232 and 234, respectively, which are identical to the principal members 132 and 134 of device 100. Device 200 differs from device 100, however, in that device 200 has mounting members for its electrodes at either end of the elongated envelope volume, rather than along the length of the device.

More specifically, electrode mounting members 246 and 248 are cap-like end members sealed in fluid-tight fashion at the ends of elongated device 200. The end members 246 and 248 have inward portions, such as inward portion 250 of end member 246, on which electrodes, such as electrodes 254, are mounted. The flow of electrons is along the length of envelope volume 236, rather than across the width of the envelope volume as it is in device 100.

Elongated reinforcing members 272, which may be made of TEFLON or other suitable non-absorbent sealing materials, are sandwiched between the corresponding pairs of edges of elongated principal members 232 and 234. These reinforcing members have no electrodes on them, but can serve to reinforce the envelope structure along its length and can further serve, along with clamping members 273 and 274 and fasteners 275, as means for supporting first and second principal members 232 and 234 in their fixed relationship to one another.

Each of the radiation-emitting devices illustrated in the drawings may have heating devices secured to their second principal members outside their envelope volumes. However, heating elements are illustrated only on radiation-emitting devices 200 and 500, shown in FIGS. 5 and 8.

Such heating elements will heat the gas contained within the envelope volumes by conduction through the second principal members to the envelope volume. The use of a metallic-coated second principal member aids in the transfer of heat from the heating elements to the gas within the envelopes, because of the good conductive qualities of metal.

The heating elements are preferably separate from the electrodes. Such heating elements can not only serve to maintain the temperature of the gas contained in the envelope, but can serve in place of electrode-associated start-up devices which prepare the gas in the envelope for operation.

Figure 8:
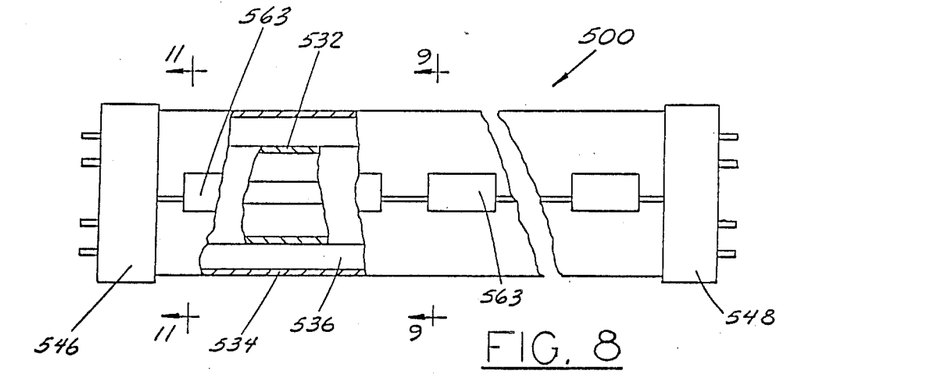
FIG. 8 is a side elevation of another radiation-emitting device.

The heating elements may be in various forms and may be arranged on or in the second elongated principal member in a number of ways. They may be on the outside of the second principal members, as shown in FIGS. 5 and 8, or may be embedded therein, or may be channels accommodating passage of a heated fluid for the purpose of transferring heat to the gas within the envelope.

FIG. 5 illustrates heating elements 263, which are secured to the outside surface of second principal member 234 of device 200, which is the lower surface of device 200. Heating elements 263 are separate from the electrodes mounted on end members 246 and 248, and operated in the manner generally described above.

Radiation-emitting device 600, shown in FIG. 12, has three parallel radiation-emitting envelopes adjacent to one another, each generally similar to device 200. Because of such similarity, device 600 will be described now.

Device 600 has several parallel first principal members 632 which together form a radiation-emitting wall 662. First principal members 632 are integrally formed of a single radiation-transmissive sheet 664, which is preferably of quartz glass. Sheet 664 may be made by known glass-forming techniques to have a repeating cross-sectional shape as shown, with three arcuate radiation-emitting areas 637, and intervening sealing and support areas 639 therebetween.

Likewise, device 600 has several parallel second principal members 634 which are integrally formed as a single formed polymeric piece 666. Element 666, which is preferably molded by known plastic-forming techniques, is formed with dividing portions 641 which have male ends 643 shaped for sealing engagement with sealing and support areas 639 of sheet 664.

Clamping members 673 and 674, which are secured to piece 666 by fasteners 675, clamp sheet 664 in place. A cover member 616 is also held in place by fasteners 675. Cover member 616 is also used to hold sealing strips 617, which are configured to receive the male sides of sealing and support areas 639, and sheet 664 firmly against male ends 643. This serves to seal parallel envelope volumes 636 from one another and the outside as well. Cover member 616 also forms passageways 618, which may be in series or in parallel, for passage of fluid to be irradiated while passing through device 600.

The inner surfaces of piece 666, which are exposed to envelope volumes 636, are preferably coated with metallic and protective coatings as described above and illustrated in FIG. 3. This increases and focuses the radiation passing through first principal members 632, and aids in irradiation of fluid passing through device 600.

Each of the envelope volumes 636 is elongated and arcuate in cross-section, as is the case in devices 100. A plurality of electrodes (not shown) are mounted at either end of the elongated envelope volumes 636, on end members. These envelopes function in the same way as does device 100, except for the fact that they are ganged together to form a radiation-emitting wall.

While electron flow is along the lengths of envelope volumes 636 in device 600, substantial modifications could be made to place electrodes in position for electron flow across the width of the envelope volumes. And a variety of other major and minor modifications are possible.

Devices of this type are particularly useful for the treatment of flowing fluids, since they discharge radiation in one general direction over a very wide area. Furthermore, they are relatively inexpensive in construction and lend themselves to easy maintenance. In some cases, the need for complex mounting structures in water treatment apparatus can be reduced or eliminated.

Radiation-emitting devices 300 and 400, shown in FIGS. 6 and 7, respectively, have a number of characteristics similar to devices 100 and 200, respectively, which were earlier described in detail. The similarities include the location of their first and second mounting members, the supporting structures on their second principal members, and the manner in which their principal members and mounting members are assembled. FIGS. 6 and 7 illustrate the same two different forms of electrode mounting which were previously described for devices 100 and 200, respectively. Such descriptions will not be repeated here.

However, devices 300 and 400 have first elongated principal members 332 and 432, respectively, which are outwardly convex in mirror-image fashion with respect to their inwardly-concave second principal members 334 and 434, respectively. This is well illustrated by FIGS. 6 and 7, which are end views in each case looking along the length of the structures and showing the cross-sections of envelope volumes 336 and 436, respectively.

In device 300, the largest inner cross-dimension of envelope volume 336 is a line extending between inward portions 350 and 352 of first and second elongated mounting members 346 and 348, respectively. The shape and dimensions of envelope volume 436 are identical to those of envelope volume 336, although the mounting members in device 400 are cap-like end members such as mounting member 446 which has inward portion 459 on which electrodes 454 are mounted. It is apparent, therefore, that envelope volumes 336 and 436 are less than the volumes of cylinders having diameters equal to the largest inner cross-dimensions of their envelope volumes.

Radiation-emitting gas is preferably contained in envelope volumes 336 and 436 at low pressure. When a heavy load of liquid being treated by radiation is exerting weight on the outside surface of first elongated principal members 332 and 432, the outwardly-convex configuration in itself may be sufficient.

In the device of FIG. 6, first and second elongated mounted members 346 and 348, like elements 146 and 148 in FIG. 1, serve among other things as reinforcement means for principal members 332 and 334. In the device of FIG. 7, a similar reinforcement function is served by similar parts.

FIG. 6 illustrates heating elements 363 secured to the outside surface of second principal member 334 in the same manner as heating elements 263 are secured to second principal member 232 in the device of FIG. 5. As with heating elements 263, heating elements 363 are separate from electrodes 354 and 356, and they are operated in the same manner.

Radiation-emitting devices 300 and 400 have many of the advantages of devices 100 and 200. They provide desirable directionality in radiation emission which is important in certain applications, such as water treatment. They also provide the important cost and upkeep advantages mentioned above. And they may be ganged together to form radiation-emitting "walls."

Radiation-emitting device 500, shown in FIGS. 8-11, has first and second elongated principal members 532 and 534 in the form of inner and outer cylindrical tubes, respectively. Inner and outer tubes 532 and 534 are concentric to one another, and define an elongated annular envelope volume 536.

Figure 9:
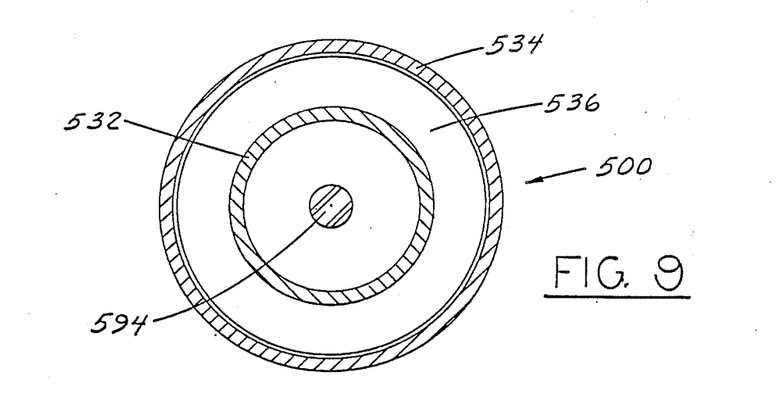
FIG. 9 is an enlarged sectional view (without background) of FIG. 8, taken along section 9—9 as indicated in FIG. 8.

The largest inner cross-dimension of annular envelope volume 536 is the inner diameter of outer tube 534. Volume 536 of elongated annular envelope 500 is quite obviously less than that of a cylinder having a diameter equal to such cross-dimension.

Inner tube 532 is radiation-transmissive, and outer tube 534 is radiation-reflective. Outer tube 534 is preferably made radiation-reflective by having a metallic coating, most preferably aluminum, on its inner surface. Radiation discharges from atoms within annular envelope volume 536 may move directly toward and through the wall of inner tube 532 or may be reflected off the outer tube 53 and then toward and through the wall of inner tube 532.

The radiation discharges are triggered by electron flow along the length of elongated annular volume 536. At opposite ends of annular envelope volume 536 are circular end members 546 and 548 which each serve as a mounting means for a plurality of electrodes between which such electron flow is created. End members 546 and 548 are each in fluid-tight engagement with the ends of inner and outer tubes 532 and 534.

The circular end members, such as end member 546, have planar inward portions, such as inward portion 552, which face one another at opposite ends of envelope volume 536. Electrodes, such as electrodes 556, are spaced around the inward portions in the manner illustrated in FIG. 11. Electron flow between opposing pairs of electrodes will maintain a continuous radiation discharge from all portions of annular volume 536.

Figure 10:
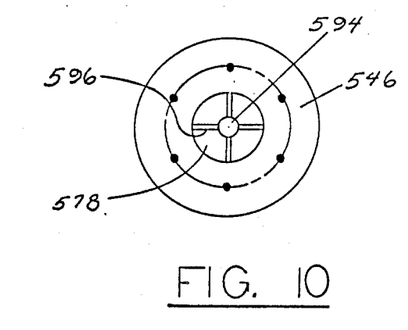
FIG. 10 is a left side elevation of FIG. 8.
Figure 11:
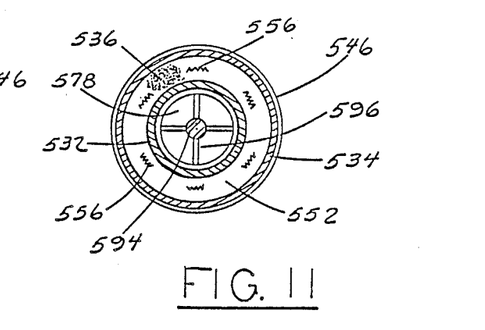
FIG. 11 is a sectional view taken along section 11—11 as indicated in FIG. 8.

As illustrated best in FIGS. 10 and 11, each of the end members 546 and 548 defines an opening therethrough, such as opening 578 in end member 546, which is generally concentric with the end member. Such openings are axially aligned with inner tube 532, and with inner tube 532 form a fluid passageway.

The configuration of device 500 allows a fluid to flow through it to be treated by radiation impacting it from all sides as it flows through inner tube 532. Such configuration is particularly suited for certain water-purification applications.

Extending concentrically through inner tube 532 from end member 536 to end member 548 is a reinforcing rod 594. At either end, rod 594 is secured to the end member by cross-supports 596, which hold rod 594 in place while still permitting the passage of fluid through end members 546 and 548. Rod 594 serves not only to reinforce radiation-emitting device 500 along its length, but may provide a mount and guide for an internal wiper element (not shown), which may be used to clean the inside surface of inner tube 532, a particular concern in water-treatment equipment.

The central concentric location of rod 594 eliminates from the volume within inner tube 532 the area of the greatest unpredictable interference effect of the radiation converging toward the axis of inner tube 532. Fluid flowing in the remaining volume of inner tube 532 is more effectively irradiated since such central volume is eliminated.

Mounted on the outside surface of outer tube 534 are several heating elements 563, as illustrated in FIG. 8. These serve the purposes discussed above. Heating elements for device 500 can come in a great variety of forms and can be arranged with respect to outer tube 534 in many different ways, particularly when the structure of outer tube 534 is thicker and more bulky than that shown in FIGS. 8-11. In one arrangement, heating elements are placed in cavities formed in the structure of outer tube 534, near the inner surface thereof. In another, channels are formed through the structure, near the inner surface thereof, to accommodate the flow of a heating fluid.

FIG. 13 illustrates a variation in one envelope portion of a multi-envelope structure such as that shown in FIG. 12. Such variation may be used in separate envelope structures as well as multiple envelope structures.

The inner surface of second principal member 734 includes a main surface 727, which is generally smooth and inwardly-concave. The variation in device 70 is the several projections 728 which extend from main surface 727 into envelope volume 736, and which terminate in distal ends 729 located adjacent to first principal member 732. Projections 728 do not separate envelope volume 736 into separate sealed sections. However, in some embodiments they may separate electron flow to some extent.

In various forms, projecting structures serve one or more of the purposes described above, including providing support at intermediate positions for a first principal member, controlling convection currents within the gas which is contained within envelope volume 736, and focusing radiation. In FIG. 13, projections 728 may be post-like structures spaced over the inner surface of second principal member 734, or they may be baffles dividing envelope volume 736. Projections 728, as shown, are for support and/or for control of convection.

The preferred second principal members, whether single or ganged together, are substantially rigid formed polymeric materials. A very wide variety of materials are acceptable for this purpose, and a wide variety of forming methods may be used. Choices of materials and forming methods would be apparent to those skilled in the art who are familiar with this invention. Factors to consider in chosing materials for the second principal members of this invention include their strength and resistance to heat.

Suitable thermoplastic materials include amorphous polymers such as polycarbonates, polyphenylene sulfides, polyphenylene oxides such as the engineering plastic identified by the trademark NORYL, polysulfones and polyimide, and crystalline thermoplastic materials like nylons, such as ZYTEL from Dupont. A variety of thermosetting materials may be used as well, such as phenolics and thermosetting polyesters.

As previously noted, the first principal members are preferably made of glass, particularly of quartz. Variations in the type of glass are possible. It is important that the material for the first principal members, whether glass or other material, have good radiation transmissivity so that radiation absorption can be minimized, and that it have sufficient strength for the particular use in mind. It is often highly preferred that the material be as thin as possible. Choice of materials for the first principal member will be apparent to those skilled in the art who are familiar with this invention.

Protective layers, such as layer 159 shown in FIG. 3, may be made of a wide variety of materials which are non-absorbent to the gases within the envelope volume. Examples of suitable materials which may be applied by spraying are vinyl organisols, polyvinyl chloride solutions, urethanes, and expoxy varnishes. Such materials should be chosen to withstand heat as well. Some materials, after being applied by spraying or otherwise, should be baked on. The choice of suitable protective materials and application methods will be well-known to those skilled in the art who are familiar with this invention.

Some of the electrical contacts necessary for operation of the radiation-emitting devices are shown in the drawings, but they form no part of this invention. Likewise, control devices which operate the plural pairs of discharge electrodes in a sequential or other fashion are not shown.

Construction methods will be apparent to those skilled in the art who are made familiar with this invention. Numerous variations on the concepts described herein can be made.

While the principles of this invention have been described in connection with specific embodiments, it should be understood clearly that these descriptions are made only by way of example and are not intended to limit the scope of the invention.

What is claimed is:

1. In a radiation-emitting device of the type having an envelope, a gas contained within the envelope, and spaced electrode means within the envelope, the improvement comprising:

said envelope including a first elongated principal member having an outwardly convex radiation-transmitting unsupported portion which is under compression and substantially free of discontinuities, and a separate inwardly concave second elongated principal member, said principal members being in fixed relative position and defining a volume of substantially constant cross-section along its length, said principal members being configured and located such that said volume is less than that of a cylinder of diameter equal to the largest cross-dimension of said volume;

the second principal member being radiation-reflective;

the first and second principal members together have two pairs of corresponding opposed edges along the length of the envelope volume, said largest inner cross-dimension being substantially equal to the spacing from one pair of opposed edges to the other;

first and second mounting means secured with respect to the principal members and having inward portions facing each other across said volume; and first and second electrode means mounted along the inward portions of the first and second mounting means, respectively.

2. The device of claim 1 wherein the second principal member has a radiation-reflective metallic coating on its inner surface.

3. The device of claim 2 wherein the metallic coating is itself covered by a protective layer.

4. The device of claim 3 wherein the second principal member is of formed polymeric material.

5. The device of claim 1 wherein each of the first and second electrode means comprises a plurality of electrodes spaced along the inward portion of its respective mounting means.

6. The device of claim 1 wherein the first and second mounting means are elongated mounting members between the corresponding opposed edges, whereby electron flow is across the width of the volume.

7. The device of claim 6 wherein the second principal member has a radiation-reflective metallic coating on its inner surface.

8. The device of claim 7 wherein the metallic coating is itself covered by a protective layer.

9. The device of claim 8 wherein the second principal member is of formed polymeric material.

10. The device of claim 1 wherein the first and second mounting means are end members secured at opposite ends of the first and second principal members, whereby electron flow is along the length of the volume.

11. The device of claim 10 wherein the second principal member has a radiation-reflective metallic coating on its inner surface.

12. The device of claim 11 wherein the metallic coating is itself covered by a protective layer.

13. The device of claim 12 wherein the second principal member is of formed polymeric material.

14. The device of claim 1 further comprising a low-pressure gas within the volume.

15. The device of claim 1 further comprising heating means secured to the second principal member outside said volume, whereby gas within the envelope can be heated.

16. The device of claim 15 wherein the electrode means and heating means are separate.

17. The device of claim 16 wherein the second principal member has a radiation-reflective metallic coating on its inner surface.

18. The device of claim 17 wherein the metallic coating is itself covered by a protective layer 19. The device of claim 18 wherein the second principal member is of formed polymeric material.

20. The device of claim 1 wherein the envelope has reinforcement means along its length, the reinforcement means extending between each pair of corresponding opposed edges.

* * * * *